United States Patent
Porikli (10) Patent No.: US 7,328,111 B2
(45) Date of Patent: Feb. 5, 2008

(54) METHOD FOR DETERMINING SIMILARITIES BETWEEN DATA SEQUENCES USING CROSS-CORRELATION MATRICES AND DEFORMATION FUNCTIONS

(75) Inventor: Fatih M. Porikli, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 323 days.

(21) Appl. No.: 10/703,961

(22) Filed: Nov. 7, 2003

(65) Prior Publication Data

US 2005/0102107 A1    May 12, 2005

(51) Int. Cl.
*G01N 33/48* (2006.01)
*G06G 7/48* (2006.01)
*G06K 9/00* (2006.01)

(52) U.S. Cl. .............................. 702/19; 702/20; 703/11; 382/128; 382/131

(58) Field of Classification Search ..................... None
See application file for complete search history.

(56) References Cited

OTHER PUBLICATIONS

Merriam-Webster's Online Dictionary, 10th Edition, definition for the word "image," retrieved and printed from the website < http://www.m-w.com/cgi-bin/dictionary?book=Dictionary&va=image> on Jan. 21, 2007.*
M. Black and A. Rangarajan, "On the unification of line processes, outlier rejection and robust statistics with application in early vision", International Journal of Computer Vision, vol. 19, 57-91, 1996.
Rubner, et al., "Empirical evaluation of dissimilarity measures for color and texture". Computer Vision and Image Understanding, vol. 84, 25-43, 2001.

\* cited by examiner

*Primary Examiner*—Shubo (Joe) Zhou
(74) *Attorney, Agent, or Firm*—Dirk Brinkman; Clifton D. Mueller; Gene V. Vinokur (57) ABSTRACT

A method compares a first data sequence with a second data sequence. A cross-correlation matrix of distances between all possible pairs of values of the first and second data sequences is constructed. A minimum cost path between diagonally opposing corners of the cross-correlation matrix is determined. The minimum cost path is projected onto a transfer function that maps between the first data sequence and the second data sequence. Then, the minimum cost path is projected onto a deformation function that corresponds to a similarity between the first data sequence and the second data sequence.

15 Claims, 9 Drawing Sheets

Fig. 1

1. Set $u_0 = v_0$ $Q = \{u_0\}$, $\Omega(u_0) = 0$, $\vec{p}(v_0) = v_0$, and $\omega(v) = \infty$ for $v \neq u_0$.

2. For each $u_i \in Q$: if $v$ is a connected to $u_i$, assign $\omega(v) \leftarrow \min\{\omega(u_i), \Omega(u_i) + \omega(v)\}$. If $\omega(v)$ is changed, assign $\vec{p}(v) = u_i$ and update $Q \leftarrow Q \cup v$.

3. Remove $u_i$ from $Q$.

4. If $Q \neq \emptyset$ go to step 2.

METHOD FOR DETERMINING SIMILARITIES BETWEEN DATA SEQUENCES USING CROSS-CORRELATION MATRICES AND DEFORMATION FUNCTIONS

FIELD OF THE INVENTION

This invention relates generally to comparing finite data sequences, and more particularly to measuring a similarity between data sequences.

BACKGROUND OF THE INVENTION

Temporal data sequences and spatial-temporal data sequences constitute a large portion of information stored in databases. Many applications need to measure similarity between data sequences instead of exact matches. A common way to analyze two time series signals or data sequences is to measure 'distances' between the two sequences. If the distance is zero, then the sequences are identical, and if the distance is less than a predetermined threshold, the sequences are considered similar.

Such analysis can be used in applications such as image retrieval, DNA pattern recognition, economic growth patterns, price and stock trends, weather and astrophysics patterns, and geological feature identification. For example, an image can be represented as a color histogram, which is a data sequence. Similar images have similar color histograms.

However, if the sequences have shape deformations, non-linear shifts, scaling, and phase shifts, then conventional distance metrics often fail. Furthermore, there is no method that can concurrently determine a distance metric between sequences, while aligning the sequences.

A major drawback of prior art 'bin-by-bin' distance measures, e.g., Minkowski, Intersection, Lorentzian, Chi, Bhattacharyya, etc., is that they account only for correspondences between bins with the same index. They do not use information across bins. For example, a shift of a bin index can result in larger distances, although the two sequences otherwise match, wielding erroneous results.

For color histograms of an image, quantization is yet another consideration. A slight change in lighting conditions can result in a corresponding shift in the color histogram. This causes the metrics to completely miss any similarity. Contribution of empty bins is also important. Weighted versions of the Minkowski metric can underestimate distances because they tend to accentuate the similarity between color sequences with many non-empty bins. Furthermore, not all sequences have the same number of bins, and the bin size can vary within the same sequence.

Not all distance measures can be extended to multi-dimensional sequences, e.g., the Kolmogrov-Smimov statistic. Computational complexity of cross-bin measures is higher than the bin-by-bin measures. In cases where the number of bins is large, or sequences are multi-dimensional, the earth mover's distance (EMD), the Hausdorff distance, and the quadratic form become infeasible.

Although cross-bin matching is possible for EMD, the Hausdorff, and the quadratic form distance, those methods do not have any mechanism to preserve the ordering of the sequences. Obviously, changing the order of the sequences can significantly deteriorate the accuracy of the distance when the similarity of the sequences is already marginal.

SUMMARY OF THE INVENTION

The invention provides a method for determining a distance metric and deformation and transfer functions for evaluating a similarity of finite length data sequences. The method according to the invention is based on a cross-correlation matrix analysis and an extrapolation of a minimum cost path obtained by dynamic programming onto a deformation function and a transfer function.

Unlike conventional sequential (bin-by-bin) and non-sequential (cross-bin) methods that determine only a single scalar distance, the invention not only measures the distance, but also determines how two finite length data sequences are correlated with each other, in terms of a transfer function which can be non-parametric or parametric.

The invention can also be used to determine how color histograms of images acquired by different cameras or different lighting conditions are correlated.

Unlike prior art radiometric calibration methods, the method according to the invention does not require special, uniformly illuminated color charts, does not determine individual radiometric responses, does not depend on additional shape assumptions of the brightness transfer functions, and does not involve exposure control.

Furthermore, the method can model non-linear, non-parametric color mismatches. The method can also handle multiple cameras that have different color dynamic ranges.

DETAILED DESCRIPTION OF THE PREFERRED EMBODIMENT

Data Sequences

A finite-length data sequence, h, is a vector [h[0], . . . , h[M]] of data values. Each 'bin' h[m] has the value of the vector at an index number m. The data sequence can represent various types of physical phenomena. In the case where the sequence h represents a color histogram of an image, the bin h[m] contains the number of pixels corresponding to a color range of m in the image, where M is the total number of the bins.

In this example, the sequence represents the pixel colors as a set of positive real numbers $\Re^+$. The widths of the bins can be made the same when the sampling frequency along the indexing axis is constant $m_i - m_{i-1} = m_j - m_{j-1}$ for every i and j. The sequence is normalized such that $$\sum_{m=0}^{M} h[m] = 1.$$

Although a color image is used as an example data sequence for the purpose of this description, the invention can be worked with other finite length data sequences that conform to the above definition, for example audio signals, radio signals, sonar signals, etc.

Cross-Correlation Matrix

Figure 1:
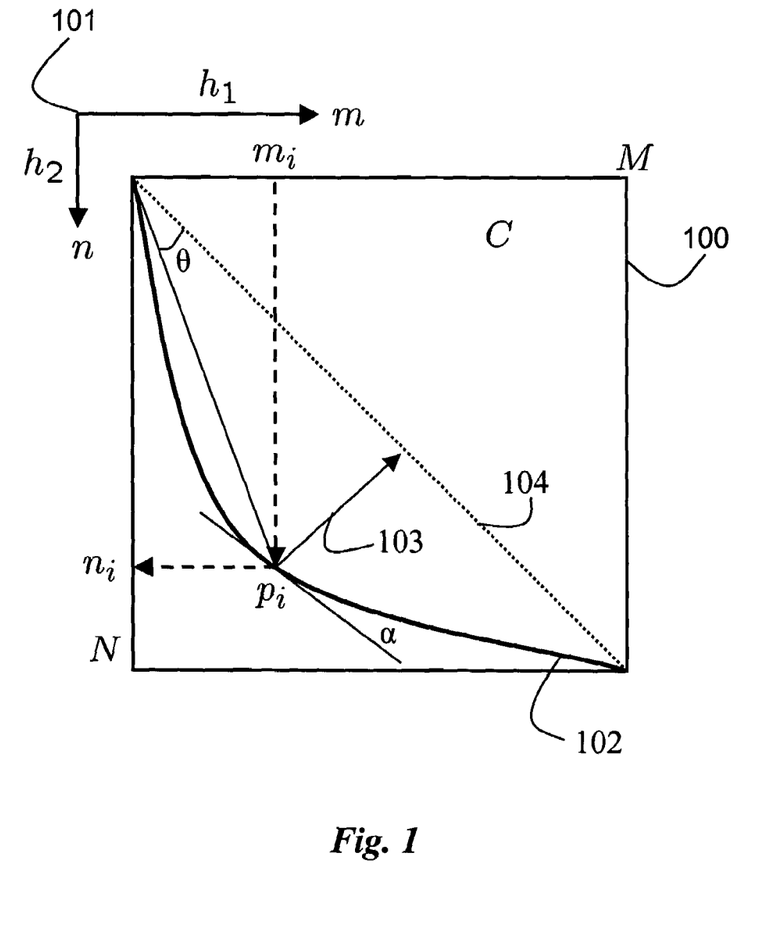
FIG. 1 is a diagram of properties of a cross-correlation matrix and minimum cost path according to the invention.

As shown in FIG. 1, a cross-correlation matrix C 100 of two data sequences 101 $h_1$ and $h_2$ is a set of positive real numbers that represent distances between all possible pairs of data values (bins) of the two sequences. Any conventional distance function d can be used to measure the pair-wise distances. For the two sequences $h_1$ and $h_2$, perhaps having different lengths m and n, the cross-correlation matrix is $$C_{M \times N} = \begin{bmatrix} c_{11} & c_{12} & \cdots & c_{1N} \\ c_{21} & \cdots & & \cdots \\ \vdots & & \ddots & \vdots \\ c_{M1} & & \cdots & c_{MN} \end{bmatrix},$$

where each element is a positive real number $$c_{mn} = d(h_1[m], h_2[n]),$$

where d is the distance function having a distance norm that satisfies the triangle-inequality, i.e., the length of any side of a triangle is less than or equal to the sum of the lengths of the other two sides.

As a matter of fact, this definition stands for the dissimilarity of sequences instead of their correlation. The similarity correlation can be established by defining $$c_{mn} = 1 - d(h_1[m], h_2[n]).$$

The definition above should not be confused with a correlation matrix that is derived from a cross-product of two vectors or quadratic distances.

In the matrix C, a sum of all elements on the diagonal of C represents the bin-by-bin distance for a given norm d(.) when the sequences have equal number of bins M=N.

Figure 7:
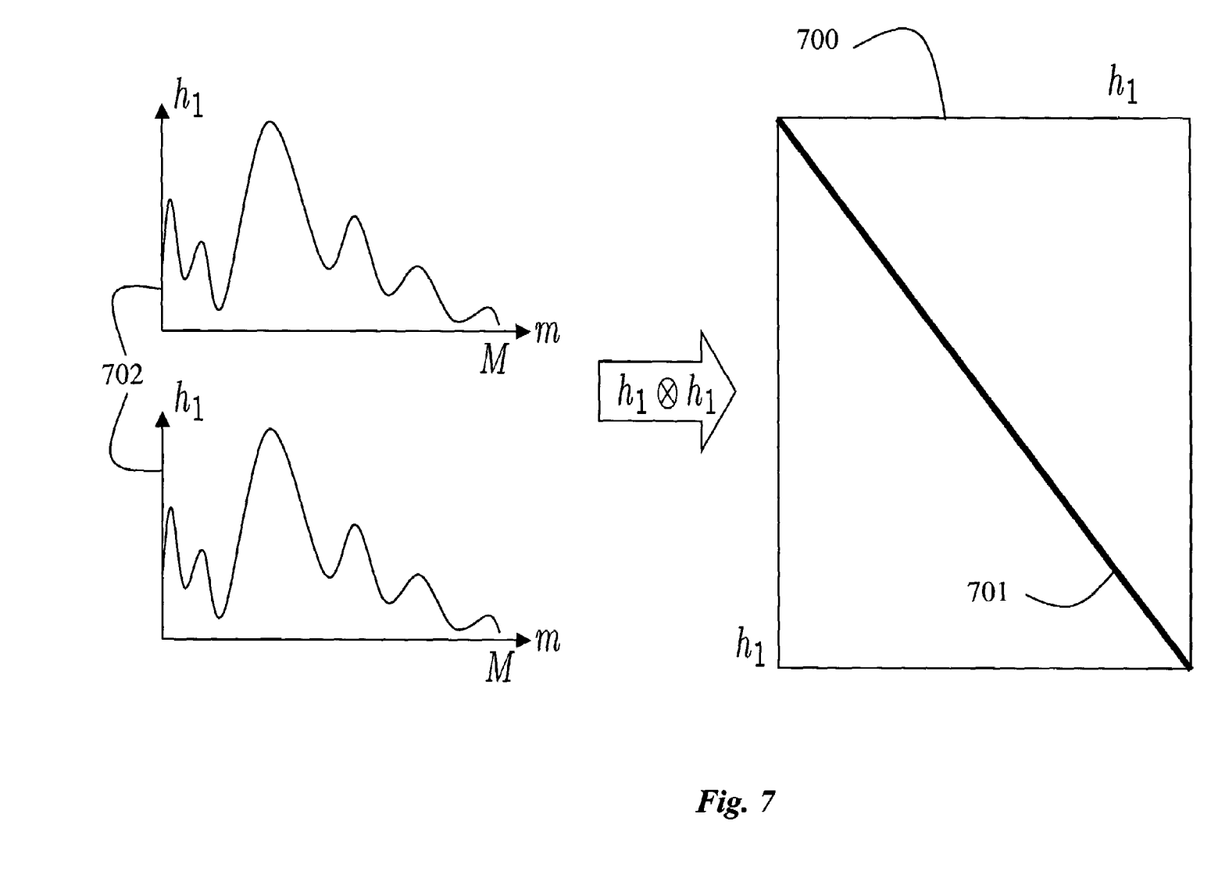
FIG. 7 is a graph of a transfer function for identical data sequences.
Figure 8:
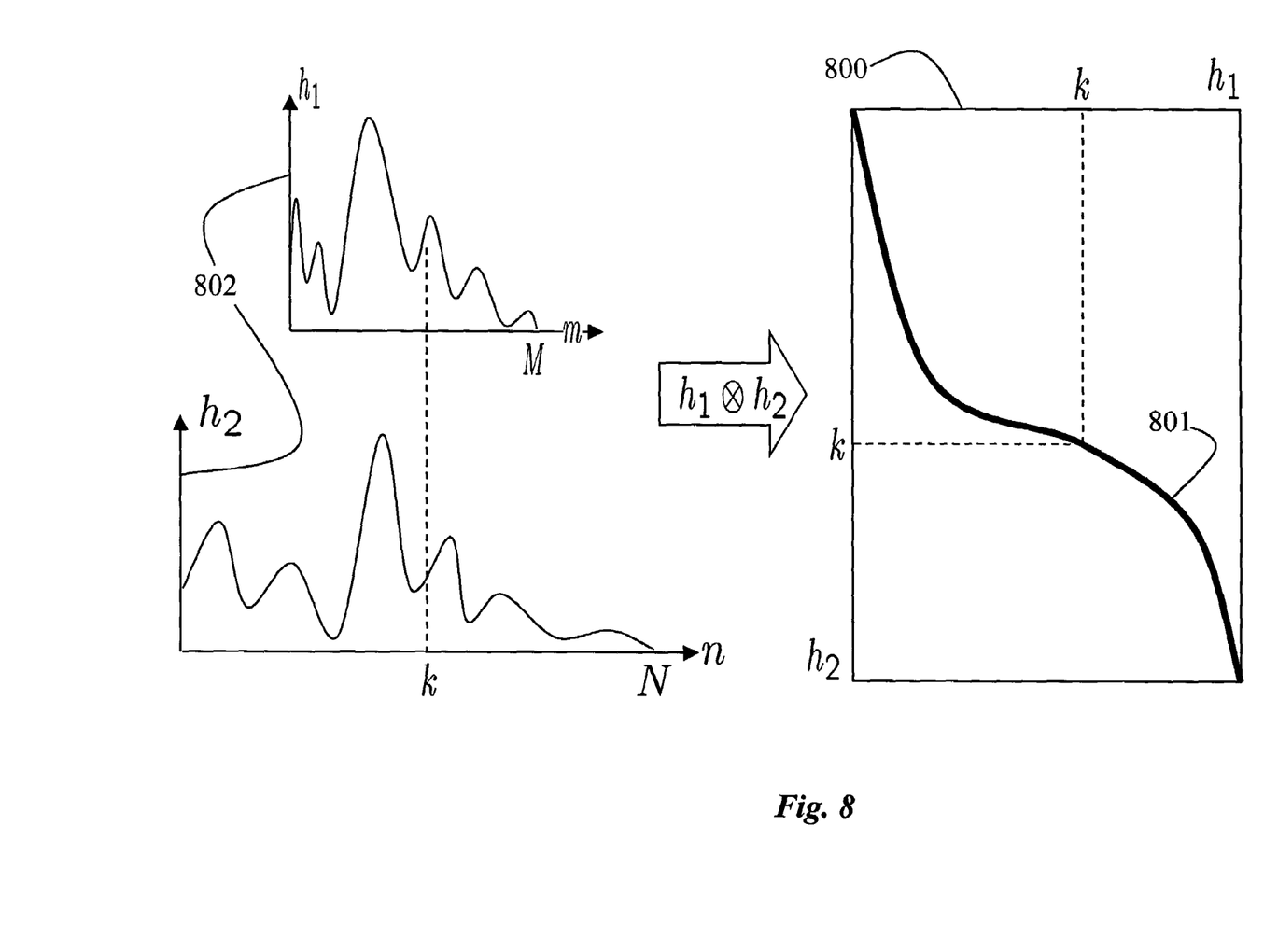
FIG. 8 is a graph of a transfer function of similar data sequences.

For example, FIG. 7 shows that a diagonal 701 of matrix 700 is zero for two identical sequences $h_1$ 702, and FIG. 8 shows a diagonal 801 of matrix 800 for two similar sequences $h_1$ and $h_2$ 802. By selecting the distance norm as $L_1$, the sum on the diagonals becomes the magnitude distance between a pair of sequences $$\sum_{m}^{M} c_{mm} = \sum_{m}^{M} |h_1[m] - h_2[m]| = d_{L1}(h_1, h_2).$$

Minimum Cost Path

A value p: $\{p_0, p_1, \ldots, p_I\} = \{(m_0, n_0), (m_1, 1_i), \ldots, (m_I, n_I)\}$ represents a minimum cost path, as defined below, from the bin $c_{11}$ to bin $c_{MN}$ in the matrix C, i.e., the sum of the matrix elements on the connected path p 102 gives the minimum score among all possible paths. The path runs between diagonally opposing corners and the path does not intersect itself. The direction α of the path is limited to $$0 \le \alpha \le \frac{3\pi}{2} \left( \text{or } \frac{\pi}{2} \le \alpha \le \pi \right)$$

where the path runs from the upper-left to the lower-right corner, or from the lower-right corner to the upper-left. Therefore, a total length I of the path is no greater than a sum of the lengths of the sequences, i.e., the sum of the dimensions of the size of the matrix C, and the length is no smaller than the length of the diagonal.

$$\sqrt{M^2 + N^2} \le I \le M + N.$$

Cost Function, Transfer Function, and Deformation Function

A cost function for the path is $g(p_i) = g((m_i, n_i)) = C_{mi,ni}$, where $p_i$ denotes the path element $(m_i, n_i)$. Here, index i runs up to the length of the total length of the path, i.e., i = 0, ..., I. A mapping from one index of the matrix C onto the other index is $$m_i \xrightarrow{T} n_i,$$

and an associated transfer function is $t(m_i) = n_i$. The transfer function reflects a relation between the indices of the elements of the minimum cost path.

A mapping from index I of the path to a projection onto the diagonal 104 of the matrix C is $$p_i \xrightarrow{F} j,$$

and an associated deformation function $f(j)$ gives the distance 103 from the diagonal 104 with respect to the projection of $p_i$. In other words, the deformation function 102 reflects the amount of difference, or similarity, from the diagonal 104.

The deformation function is a mapping from an index of the diagonal to real numbers $f(j) \in \Re$ where j = 0, ..., J, such that $$J = \sqrt{M^2 + N^2}.$$

Depending on the shape of the path, these mappings are not always one-to-one.

An angle θ between the diagonal and a current path index is $$\theta = \tan^{-1}\left(\frac{M}{N}\right) - \tan^{-1}\left(\frac{m_i}{n_i}\right).$$

Without loss of generality, the histograms have equal number of bins M=N, i.e., $$\tan^{-1}\left(\frac{M}{N}\right) = \frac{\pi}{4}.$$

The index of the projection j onto the diagonal is $$j = |p_i|\cos\theta$$
$$= \sqrt{m_i^2 + n_i^2}\cos\left(\frac{\pi}{4} - \tan^{-1}\left(\frac{m_i}{n_i}\right)\right)$$
$$= \frac{m_i + n_i}{\sqrt{2}}$$

Thus, the deformation function $f(j)$ becomes $$f(j) = \sqrt{-j^2 + (m_i^2 + n_i^2)}$$
$$= \sqrt{\frac{1}{2}(m_i^2 + n_i^2) + m_i n_i}.$$

The deformation function $f(j)$ is negative if $m_i < n_i$.

The derivatives of the deformation function with respect to both matrix indices represent an amount of warping of the sequences $\partial f(j) = 0$: no warping $\partial f(j) < 0$: $h_1$ warped $\partial f(j) > 0$: $h_2$ warped where the derivative of $f(j)$ with respect to j is limited in a range $$-\frac{\pi}{2} \le \partial f(j) \le \frac{\pi}{2}.$$

It is straightforward to derive the following properties $f(j) = 0 \Rightarrow m_i = n_i$ $f(j) > 0 \Rightarrow m_i > n_i$ $f(j) < 0 \Rightarrow m_i < n_i$ Similarity Distance Metrics A first cross-correlation distance metric can be expressed as a total cost of the minimum cost path $$d_{CC}(h_1, h_2) = \sum_{i=0}^{I} g((m_i, n_i)).$$

A second distance metric weights the deformation function with a current cost $$d_{CC}(h_1, h_2) = \sum_{j=0}^{J} |f(j)|g((m_i, n_i)) = \sum_{i=0}^{I} \left|f\left(\frac{m_i+n_i}{\sqrt{2}}\right)\right|g((m_i, n_i)).$$

A third metric is the area between the deformation function and the diagonal $$d_{CC}(h_1, h_2) = \sum_{j=0}^{J} |f(j)|.$$

A fourth distance metric is the total length of the minimum cost path, which is same as the length of the deformation function $$d_{CC}(h_1, h_2) = l = \int_0^J |\partial f(j)|\, dj.$$

If each element of the cross-correlation function is defined as $c_{mn} = d(h_1[m], h_2[n])$, then the above equations reflect the distance between two histograms. If the elements are defined as $c_{mn} = 1 - d(h_1[m], h_2[n])$, then the above equations measure the similarity of two histograms.

Dynamic Programming to Find Minimum Cost Path

Dynamic programming can be used to solve sequential, or multi-stage, decision problems, by breaking the problem into a series of single variable problems. The essence of dynamic programming is based on the principle of optimality. This principle states that from any point on an optimal trajectory, the remaining trajectory is optimal for the corresponding problem initiated at that point.

In the context of the present invention, this is equivalent to determining the best 'alignment' of two data sequences. The invention reduces this comparison problem for two sequences to finding a minimum cost path in a directed weighted graph.

A minimum cost path from an origin vertex to a destination vertex in the directed weighted graph is a path that has smallest total edge-weights among all paths from the origin vertex to the destination vertex. In the directed weighted graph, a vertex is v, an edge between two vertices is e, and a cost of an edge is w(e).

The minimum cost path from the origin vertex $v_0$ to the destination vertex $v_S$ is the sum of all constituent edges $$\Omega(p(v_0, v_S)) = \sum_s \omega(v_S).$$

If the costs $(v_0, v^*)$ from vertex $v_0$ to every other vertex is known, and $v^*$ is the penultimate vertex before the destination $v_S$, then the overall path is formed by concatenating a path from $v_0$ to $v^*$, i.e., $p(v_0, v^*)$, with and edge $e(v^*, v_S)$.

Furthermore, the path $p(v_0, v^*)$ is a minimum cost path, because otherwise, concatenating the minimum cost path with edge $e(v^*, v_S)$ decreases the cost of the overall path. Another observation is that $(v_0, v^*) \le \Omega(v_0, v_S)$, because $\Omega(v_0, v_S) = \Omega(v_0, v^*) + \omega(v^*, v_S)$, assuming all edges have non-negative costs, i.e., $\omega(v^*, v_S) \ge 0$. Therefore, if the correct value of $(v_0, v^*)$ is known, then the minimum cost path can always be found by dynamic programming.

Figure 2:
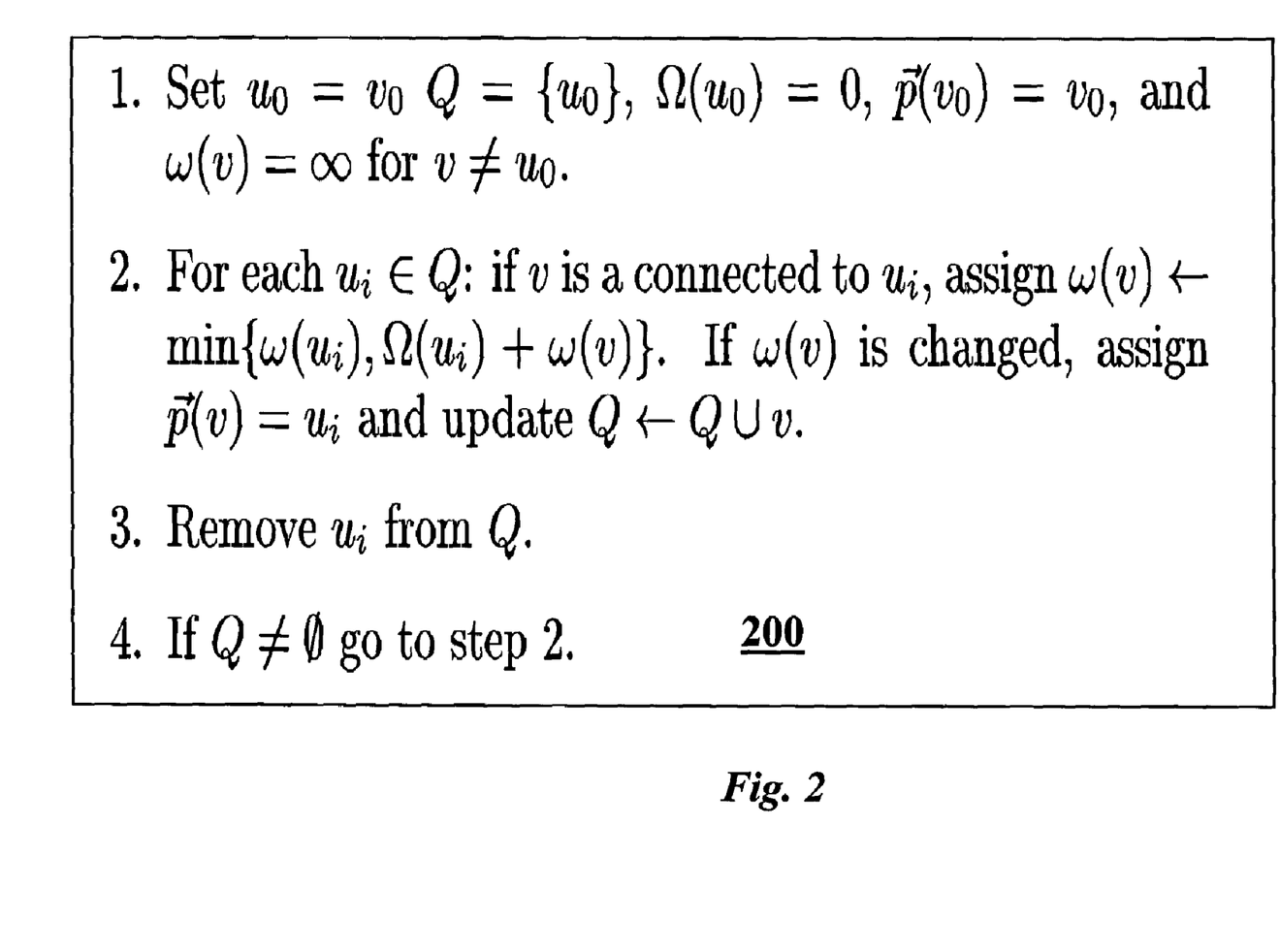
FIG. 2 is a block diagram of a process for finding a minimum cost path in the cross-correlation matrix of FIG. 1.

As shown in FIG. 2, it is possible to find all shortest paths between one origin vertex and all other vertices, which are destination vertices. To find all minimum cost paths between all pairs of vertices, treat each of the vertices as a source vertex.

Let Q be the set of active vertices whose minimum cost paths from $v_0$ have already been determined, and $\vec{p}(v)$ is a back pointer vector that indicates a neighboring minimum cost vertex of vertex v.

For the iterative procedure 200 shown in FIG. 2, the minimum cost path $p(v_0, v_s) = \{v_0, \ldots, v_S\}$ is obtained by tracing back pointers starting from the destination vertex $v_s$ as $v_{s-1} = \vec{p}(v_s)$.

Step 1 initializes the parameters of the procedure 200.
Step 2 assigns the cost to a vertex in the graph.
Step 3 removes that vertex, until all active vertices are processed.
Step 4 iterates.

Figure 3:
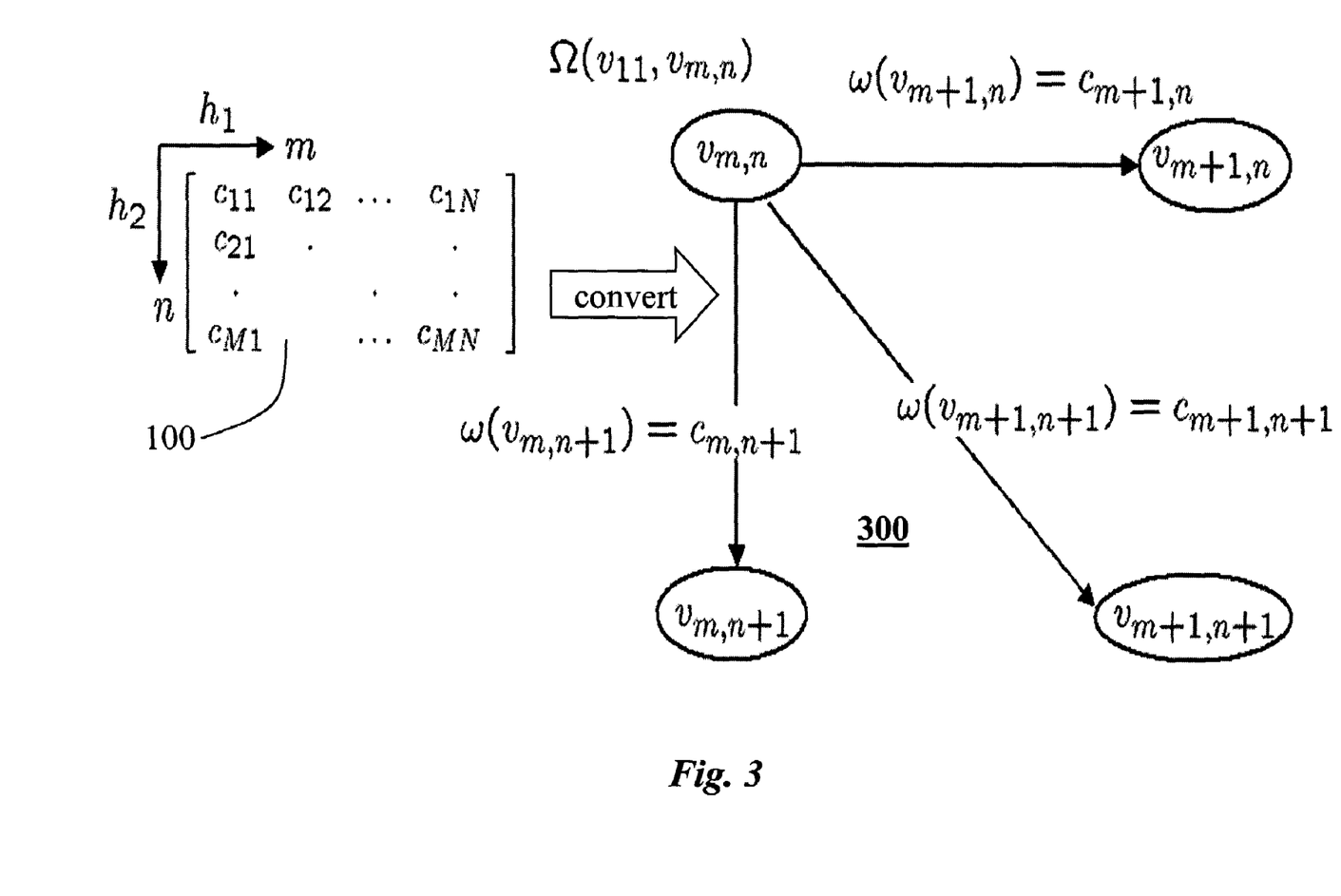
FIG. 3 is a directed weighted graph used by the invention.

As shown in FIG. 3, the cross-correlation matrix 100 can be converted to a directed graph 300 such that a vertex $v_{mn}$ has only directional edges to vertices $v_{m+1,n}$ and $v_{m,n+1}$, $v_{m+1,n+1}$. Therefore, overlap of the bin indices is not allowed, and cycle paths are eliminated.

Dynamic programming can be applied to obtain the partial matches between two sequences. To find the best match for a part $[m_a, \ldots, m_b]$ of the first sequence in the second sequence, the initial conditions is such that the initial vertex is iteratively assigned to $(m_a, n_1)$, where $n_1 = 1, \ldots, N$.

The target vertex is $(m_b, n_2)$, where $$n_2 = \frac{n}{M} m_a, \ldots, N.$$

The above process is repeated for every combination and the minimum cost path is selected.

The above procedure finds a minimum cost path for each element of the cross-correlation function that is defined as $c_{mn} = d(h_1[m], h_2[n])$. In case the elements is defined as $c_{mn} = 1 - d(h_1[m], h_2[n])$. the procedure finds a maximum cost path using the above method instead of the minimum cost.

Although, the invention so far has been described with respect to correlating two 1D data sequences, it should be understood that the method is also applicable to 2D data sequences, or sequences of higher dimensions.

For example, for two finite length 2D data sequences, a 4D cross-correlation array is computed and a minimum cost path is found such that each element (x, y) of the first 2D data sequence is paired with an element (u, v) of the second 2D data sequence $$(x,y) \xrightarrow{T} (u,v).$$

Illumination Compensation

The transfer function as described above can be used in a number of applications. One application corrects the exposure in images taken by cameras. The images can be taken by one camera or multiple different cameras. The compensation can be gray-scale or color.

Figure 4A:
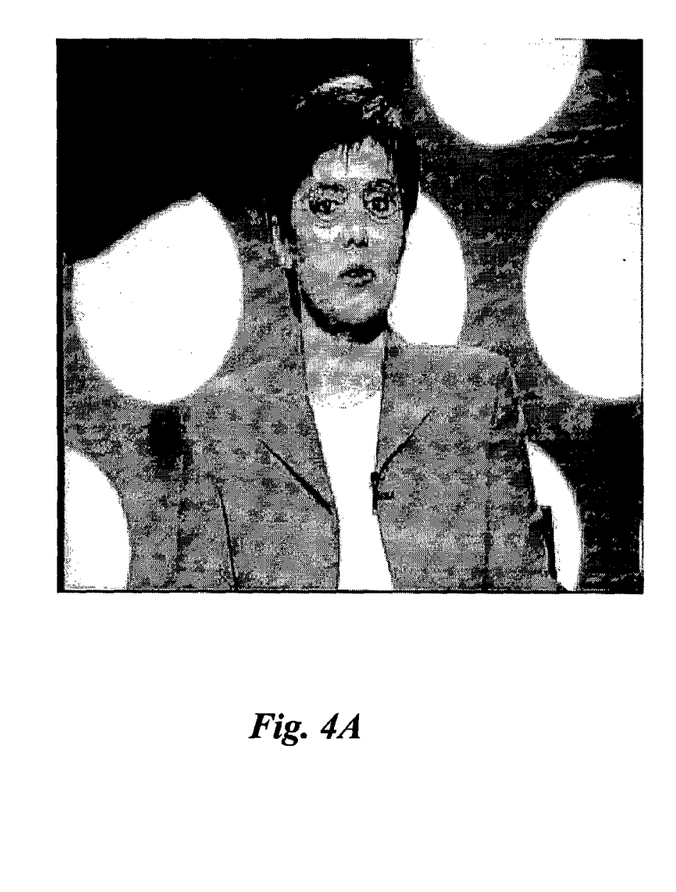
FIG. 4A is an original image.
Figure 4B:
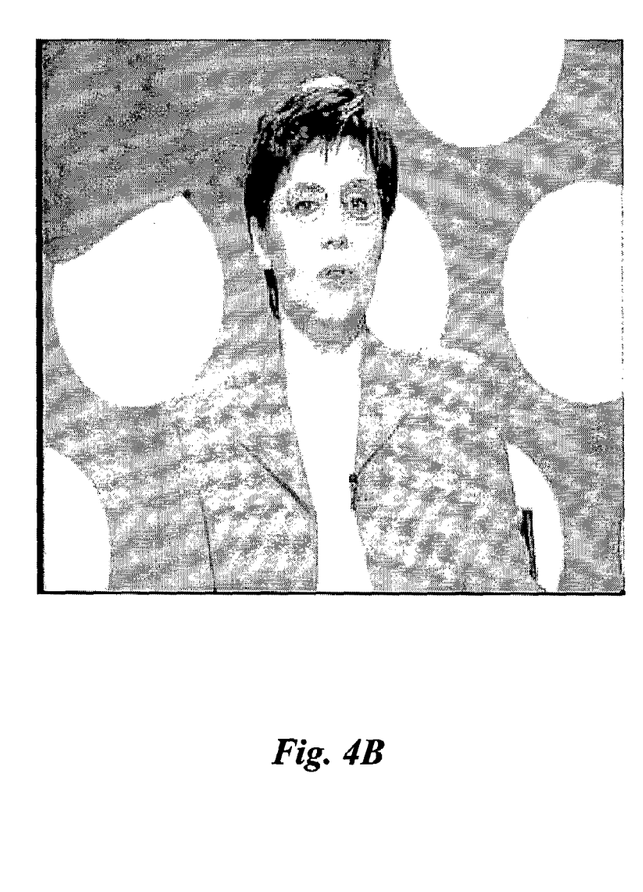
FIG. 4B is a distorted version of the image of FIG. 4A.

FIG. 4A shows a sample image, and FIG. 4B shows an over-exposed version with distorted intensity values. The transfer function according to the invention is used to compensate the distorted version of FIG. 4B, see FIG. 6B.

Figure 5A:
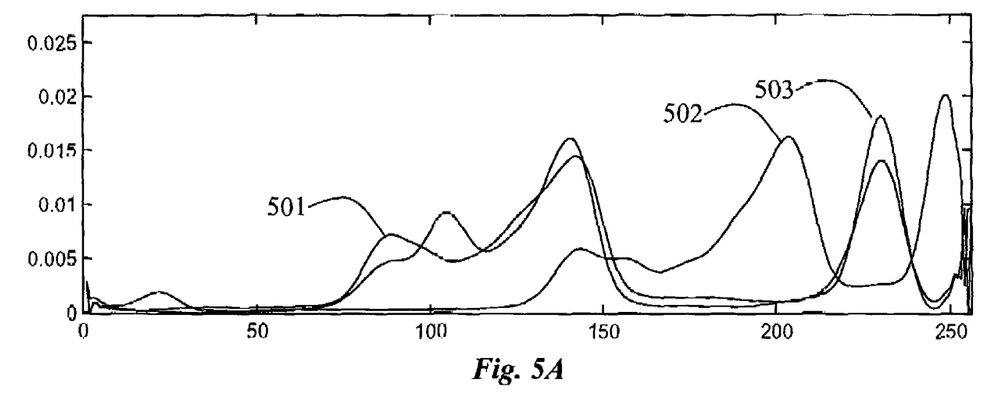
FIG. 5A is a graph of data sequences obtained from color histograms of images.

FIG. 5A shows data sequences representing the images in the form of a histogram that has 256 bins on the x-axis and normalized bin values on the y-axis, i.e., the number of image pixels corresponding to each bin divided by the total number of pixels. The sequences are the histograms of sample image 501, the exposed image 502, and a compensated image 503, see FIG. 6B.

Figure 5B:
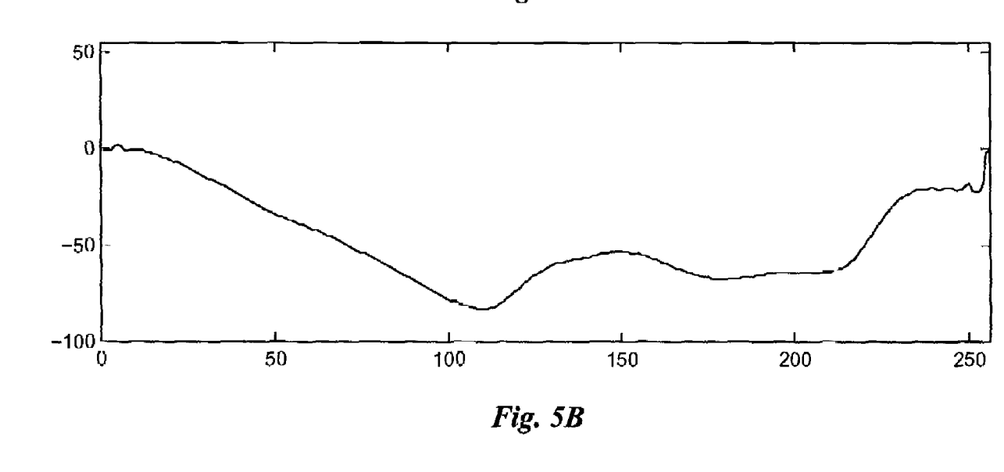
FIG. 5B is a graph of a transfer function according to the invention.
Figure 6A:
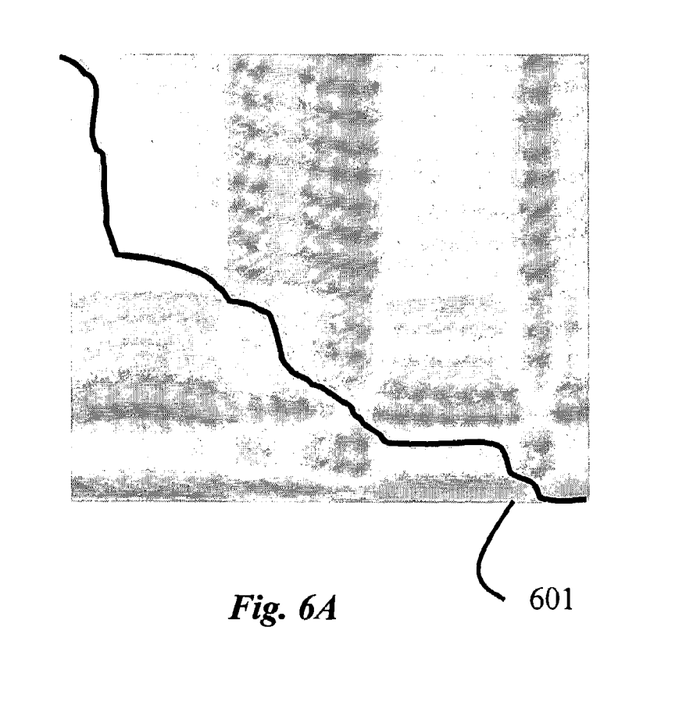
FIG. 6A is a cross-correlation matrix obtained from the sequences of FIG. 5A.

FIG. 5B shows the transfer function. FIG. 6A shows the cross-correlation matrix obtained from the histograms. Here, the distance kernel is an L2 norm.

A minimum cost path 601 is determined using dynamic programming. The minimum cost path starts from the lower-right corner of the matrix and ends at the upper-left corner.

Figure 6B:
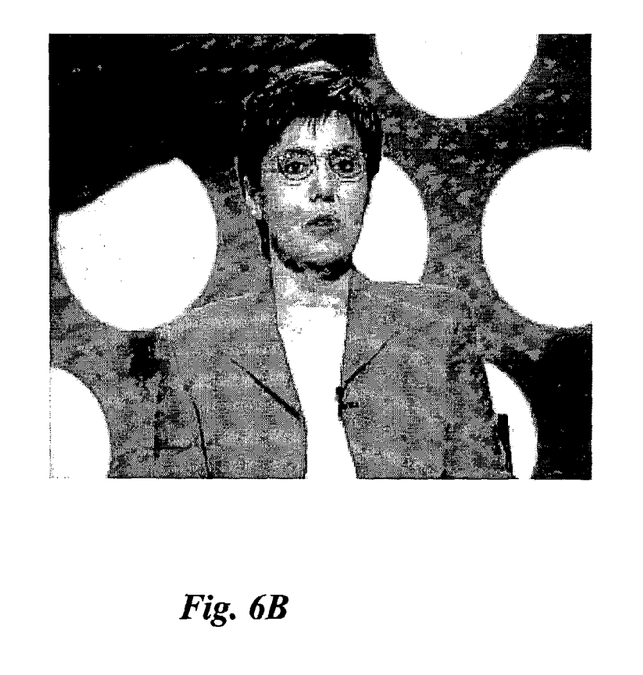
FIG. 6B is a compensated version of the image of FIG. 4B.

FIG. 6B is the compensated image produced by applying the transfer function. The intensity values of the over-exposed image of FIG. 4B are remapped using the transfer function that is obtained by projecting the minimum cost path of FIG. 5B on the main diagonal as described above. Note that the distortion is neither linear nor parametric. Instead, the transfer function matches the non-linear distortion characteristics of the image. The compensated images are visually similar to the original image as confirmed by the similarity of the histograms 501 and 503.

The improvement is substantial even though histogram operations are invariant to spatial transformations, and thus have only limited impact. The distances of the two histograms are determined such that the distance score enables the amount of non-linear and non-parametric—but sequential alignment of the two histograms. This is not possible with conventional distance metrics. It should be understood that the same technique can be used for over-exposed images.

Camera Calibration

Another application where the invention can be used is in multi-camera color (radiometric) calibration. It is well known that cameras have different optical characteristics and color sensitivities. Even if the cameras are identical, different lighting can vary the color responses of the cameras. Without color calibration, images of the same scene acquired by different cameras appear to have color dissimilarities. In a movie or video, where shots of scene at various angles are spliced together this would be annoying. Image correspondence, face recognition, and other related computer vision tasks often fail when colors do not match. Remote sensing, image retrieval, face identification are other applications that depend on accurate color compensated images.

A common prior art method acquires reference images of a uniformly illuminated color chart of a known reflectance. However, uniform illumination is only possible in a highly controlled environment, for example in a studio. Even there, temperature changes can significantly effect surface reflectance. For outdoor scenes, uniform illumination is practically impossible. Instead of color charts, some methods use registered images of a scene taken under different exposure settings. However, those methods assume a smooth and polynomial response function in the acquired images.

Figure 9:
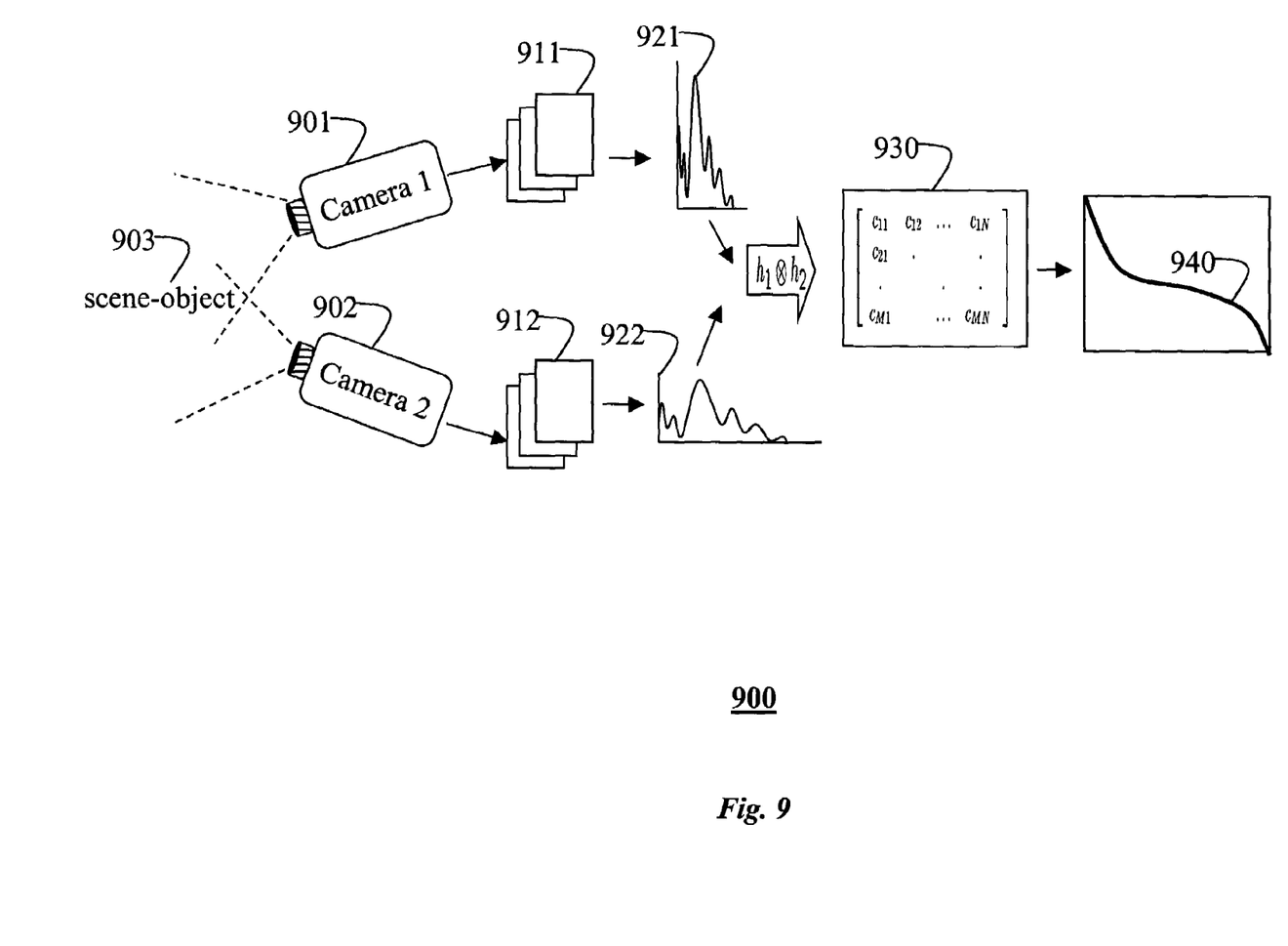
FIG. 9 is a flow diagram of an image compensation method according to the invention.

FIG. 9 shows a color calibration method 900 for multiple cameras 901-902 acquiring images 911-912 of a scene 903. For example, the images are in form of videos. It is desired to calibrate the cameras for the colors of a specific object. Then, the object can be tracked and extracted from the videos using conventional object tracking and background subtraction in a preprocessing step.

The relation between the radiometric responses of the cameras is determined from color histograms of images acquired by the cameras. Therefore, data sequences 921-922, in the form of color histograms, are extracted from the images. For a color image, three 1-D histograms are extracted, one for each color channel. Each histogram, $h_i$, is a vector $[h[0], \ldots, h[M]]$ of 'bins'. Each bin h[m] stores the number of pixels corresponding to a color range m in image I, where M is the total number of the bins. The partitioning of the color ranges can be regular. If the target distribution properties are unknown, the partitioning can be irregular.

The histograms are converted to cross-correlation matrices by measuring pair-wise distances between the sequences. The matrices are aggregated into matrix 930 by averaging the individual matrices. This matrix is a superset of all the bin-by-bin distance norms of the color histograms. The matrix can be normalized by including a scaling factor.

Dynamic programming, as described above, is applied to the cross-correlation matrix to determine a minimum cost path. The minimum cost path is projected onto a diagonal axis of the matrix to obtain a transfer function 940. The transfer function can map one histogram to another. It should be noted that an inverse mapping can also be derived. The shape of the path indicates the amount of warping between the histograms. For color images, three transfer functions are used, one for each color channel, to establish the radiometric relation between two color cameras because the radiometric relation is separable and channel-wise independent. Because the transfer functions have transitive property, by using transfer functions from channel $C_a$ to channel $C_b$, and from channel $C_b$ to channel $C_c$, the transfer function between channels $C_a$ and $C_c$ can be determined. Effectively, the transfer function represents a color calibration of the cameras.

It should be noted, that the method can be applied to a single color channel, i.e., a gray scale image. It should also be noted that the images do not necessarily need to be visible. That is, the images can reflect other wavelengths in the electro-magnetic spectrum, e.g., infra-red, as well as audio frequencies.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

I claim:

1. A computer-implemented method for comparing a first data sequence with a second data sequence, comprising the steps of:
   constructing a cross-correlation matrix of distances between all possible pairs of values of the first and second data sequences, in which the first data sequence represents a first image and the second data sequence represents a second images;
   determining a minimum cost path between diagonally opposing corners of the cross-correlation matrix;
   determining, according to the minimum cost path, a transfer function that maps between the first data sequence and the second data sequence;
   applying the transfer function to the second data sequence to produce a third image; and
   outputting the third image to a user.

2. The method of claim 1, in which each data sequence is a color histogram of each corresponding image.

3. The method of claim 1, in which the first data sequence and the second data sequence have identical lengths.

4. The method of claim 1, in which the first data sequence and the second data sequence have different lengths.

5. The method of claim 1, in which a total length of the minimum cost path is no greater than a sum of lengths of the first and second data sequences.

6. The method of claim 1, in which a total length of the minimum cost path is no smaller than a length of a diagonal of the cross-correlation matrix.

7. The method of claim 1, in which a total cost of the minimum cost path measures the similarity of the first data sequence and the second data sequence.

8. The method of claim 1, further comprising:
   converting the cross-correlation matrix to a directed weighted graph; and
   applying dynamic programming to the directed weighted graph to determine the minimum cost path.

9. The method of claim 1, in which the first data sequence represents a reference image with correct exposure and the second data sequence represents a second image with incorrect exposure, and further comprising:
   mapping intensity values of the reference image to a compensated image according to the transfer function.

10. The method of claim 1, in which the transfer function is specified parametrically.

11. The method of claim 1, in which a plurality of pairs of images of a scene are acquired, each pair acquired by a first camera and a second camera, and further comprising:
   reducing each pair of images to a pair of data sequences;
   constructing a plurality of cross-correlation matrices from the pairs of data sequences;
   combining the plurality of cross-correlation matrices into a single cross-correlation matrix;
   determining the minimum cost path running between diagonally opposing corners of the single cross-correlation matrix; and
   determining, according to the minimum cost path, the transfer function that radiometrically calibrates the first and second camera.

12. The method of claim 1, further comprising:
   determining, according to the minimum cost path, a deformation function that corresponds to a similarity between the first data sequence and the second data sequence.

13. The method of claim 12, in which the deformation function is weighted with corresponding elements of the cross-correlation matrix to measure the similarity of the first data sequence and the second data sequence.

14. The method of claim 12, which a length of the deformation function is equal to a length of the minimum cost path to measure the similarity of the first data sequence and the second data sequence.

15. The method of claim 12, in which an area of the deformation function measures the similarity of the first data sequence and the second data sequence.

* * * * *